US012599912B2

(12) United States Patent
Häberle et al.

(10) Patent No.: US 12,599,912 B2
(45) Date of Patent: Apr. 14, 2026

(54) METHOD FOR CONTROLLING AND/OR REGULATING THE FEED OF MATERIAL TO BE PROCESSED TO A CRUSHING AND/OR SCREENING PLANT OF A MATERIAL PROCESSING DEVICE

(71) Applicant: Kleemann GmbH, Göppingen (DE)

(72) Inventors: Steffen Häberle, Herbrechtingen (DE); Till Krauss, Rechberghausen (DE); Jochen Meier, Hülben (DE)

(73) Assignee: Kleemann GmbH, Göppingen (DE)

(*) Notice: Subject to any disclaimer, the term of this patent is extended or adjusted under 35 U.S.C. 154(b) by 418 days.

(21) Appl. No.: 18/171,442

(22) Filed: Feb. 20, 2023

(65) Prior Publication Data

US 2023/0285981 A1 Sep. 14, 2023

(30) Foreign Application Priority Data

Mar. 8, 2022 (DE) ..................... 10 2022 105 343.1

(51) Int. Cl.

*B02C 25/00* (2006.01)
*B02C 23/02* (2006.01)
*B02C 23/08* (2006.01)

(52) U.S. Cl.

CPC .............. *B02C 25/00* (2013.01); *B02C 23/02* (2013.01); *B02C 23/08* (2013.01)

(58) Field of Classification Search

CPC ......... B02C 25/00; B02C 23/02; B02C 23/08; B02C 23/00; B07B 1/42; B07B 1/46

See application file for complete search history.

(56) References Cited

U.S. PATENT DOCUMENTS 4,749,273 A 6/1988 Reinhold
8,770,501 B2 7/2014 Laukka et al.
9,156,192 B2 * 10/2015 Butler .................... B02C 19/06

(Continued)

FOREIGN PATENT DOCUMENTS

AT 523812 A1 11/2021
AU 2003212051 A1 1/2004

(Continued)

OTHER PUBLICATIONS

German office action for corresponding patent application No. 10 2022 105 346.6, dated Nov. 11, 2022, 8 pages.

(Continued)

*Primary Examiner* — Santiago Garcia

(74) *Attorney, Agent, or Firm* — Lucian Wayne Beavers; Patterson Intellectual Property Law, PC

(57) ABSTRACT

The invention relates to a method for controlling and/or regulating the feed of material to be processed, in particular rock material, to a crushing and/or screening plant of a material processing device, wherein a conveyor device is used to guide the material to be processed to the crushing and/or screening plant, wherein a characteristic of the material to be processed is determined, and/or wherein a volume flow of the material to be processed is determined, and wherein a conveying speed of the conveyor device is controlled and/or regulated taking into account the characteristic and/or the volume flow of the material to be processed. The invention also relates to a material processing device designed to perform such a method.

16 Claims, 2 Drawing Sheets

(56) References Cited

U.S. PATENT DOCUMENTS

| | | | | |
|---|---|---|---|---|
| 11,383,246 | B2 | 7/2022 | Eckert et al. | |
| 11,896,983 | B2 * | 2/2024 | Mitchell | B03B 5/04 |
| 2012/0223167 | A1 * | 9/2012 | Butler | B02C 25/00 241/33 |
| 2017/0036967 | A1 * | 2/2017 | Sevast'Yanov | C05F 11/06 |
| 2018/0369829 | A1 | 12/2018 | Kaartinen et al. | |
| 2019/0009279 | A1 * | 1/2019 | Anderson, Jr. | B02C 4/10 |
| 2019/0070636 | A1 * | 3/2019 | Lazzarini | B07B 1/12 |
| 2020/0061632 | A1 | 2/2020 | Venturi et al. | |
| 2020/0384506 | A1 * | 12/2020 | Hunt | B07C 5/3427 |
| 2021/0114885 | A1 * | 4/2021 | Mueller | C01B 33/037 |
| 2021/0402438 | A1 | 12/2021 | O'Brien et al. | |
| 2023/0001424 | A1 * | 1/2023 | Mitchell | B03B 5/04 |

FOREIGN PATENT DOCUMENTS

| | | | |
|---|---|---|---|
| CN | 102076417 | A | 5/2011 |
| CN | 103990538 | A | 8/2014 |
| CN | 107755063 | A | 3/2018 |
| CN | 110064496 | A | 7/2019 |
| DE | 3411540 | A1 | 10/1985 |
| DE | 102012016332 | B4 | 11/2016 |
| DE | 102017124958 | A1 | 4/2019 |
| WO | 2009156585 | A1 | 12/2009 |
| WO | 2017093608 | A1 | 6/2017 |
| WO | 2020193137 | A1 | 10/2020 |

OTHER PUBLICATIONS

German office action for corresponding patent application No. 10 2022 105 343.1, dated Nov. 9, 2022, 8 pages.

Corresponding co-pending U.S. Appl. No. 18/171,445, filed Feb. 20, 2023.

China Office Action for corresponding patent application No. 2026012001897710, dated Jan. 15, 2026, 11 pages.

European Search Report for corresponding patent application No. 23155167.2, dated Aug. 10, 2023, 8 (pages).

* cited by examiner

METHOD FOR CONTROLLING AND/OR REGULATING THE FEED OF MATERIAL TO BE PROCESSED TO A CRUSHING AND/OR SCREENING PLANT OF A MATERIAL PROCESSING DEVICE

BACKGROUND OF THE DISCLOSURE

Field of the Disclosure

The invention relates to a method for controlling and/or regulating the feed of material to be processed, in particular rock material, to a crushing and/or screening plant of a material processing device, wherein a conveyor device is used to guide the material to be processed to the crushing and/or screening plant.

In the context of the invention, controlling may refer to open loop control and regulating may refer to closed-loop (feedback) control.

The invention also relates to a material processing device having a crushing and/or screening plant for processing a material, in particular rock material, wherein a conveyor device is used to guide the material to be processed to the crushing plant and/or the screening plant.

Description of the Prior Art

Such material processing devices according to the invention can be used, for instance, for crushing and/or sorting feed material, in particular rock material such as natural stone, concrete, bricks, or recycled material. The material to be processed is fed to a feed unit of the material processing device, for instance in the form of a hopper, and fed to a crusher and/or a screen via a conveyor device, for instance a vibratory feeder or a belt conveyor. A pre-screen unit can be installed upstream of the crusher, for instance to pass a fine fraction or a medium fraction, which already has a suitable grain size, past the crusher. The pre-screen unit can be part of the conveyor device.

The efficiency and cost-effectiveness of such material processing devices depend to a large extent on a demand-oriented feed of the material to be processed. If, for instance, a crusher is overfilled, this leads to high mechanical loads and excessive wear. If it is underfilled, the desired quality of the end product is no longer achieved. In screening plants, on the other hand, the separation efficiency decreases noticeably with increasing layer thickness on the screen lining. Thus, in order to be able to operate material processing devices and, in particular, crushing and/or screening plants in favorable operating ranges, it is necessary to control the feed.

For instance, operating parameters such as crusher filling level, capacity utilization of the drive system or operating loads occurring at the crusher or screen can be determined and used to control the feed. Consequently, the system can react to an overload or underload. Such a method is known from DE 10 2017 124 958 A1.

SUMMARY OF THE DISCLOSURE

The invention addresses the problem of providing an improved method for controlling and/or regulating the feed of material to be processed to a crushing and/or screening plant of a material processing device. The invention further addresses the problem of providing a material processing device adapted to perform such a method.

The task relating to the method is solved in that a characteristic of the material to be processed is determined, and/or in that a volume flow of the material to be processed is determined, and in that a conveying speed of the conveyor device is controlled and/or regulated taking into account the characteristic and/or the volume flow of the material to be processed.

In accordance with the invention, predictive process parameters, in particular the volumetric flow rate of the fed material to be processed and/or a characteristic of the material to be processed, are used for control purposes. This can prevent, or at least largely prevent, the risk of overload situations and/or underload situations. In this way, the production process and consequently machine utilization, fuel efficiency, and the quality of intermediate and end products can be improved.

According to the invention, it is not only possible to react to an overload or underload situation. Actually, volumetric flow and/or characteristic can be determined before the material to be processed reaches the crushing and/or screening device. It can then be determined how much material and/or material of what characteristic will reach the crushing and/or screening device. Taking into account these predictive parameters, the control of the conveyor speed of the conveyor device can be performed in an improved manner.

It is conceivable, for instance, that the determined volumetric flow and/or the determined characteristic are transferred to a data processing equipment, for instance a computing and/or storage unit of the material processing device. By means of the data processing equipment, a target conveying speed can be determined, taking into account the transferred parameters. For instance, one or more tables, maps, and/or functional relationships may be stored in the data processing equipment that can be used to determine a target conveyor speed based on the predictive parameters entered. This target conveying speed can then be applied to the conveyor device by the control or regulation system.

Accordingly, the feed of material to be processed to the crushing and/or screening device can be controlled in advance to prevent any overload or underload from occurring, or to at least reduce the frequency of overload or underload situations.

Alternatively or additionally, it is conceivable that the predictive parameter(s) is/are used to set other and/or further machine parameters, such as, for instance, to set a crushing gap, a rotor speed of an impact crusher, an excitation frequency and/or amplitude of a screening plant and/or a prescreen.

Preferably, provision can be made for a speed of the material to be processed to be determined, for a layer thickness of the material to be processed to be determined on the conveyor device, and for the volume flow of the material to be processed to be determined from the determined layer thickness, from the determined speed, and from a geometry of the conveyor device.

The characteristic can advantageously comprise a feed size and/or a type of material to be processed, in particular a type of rock. A feed size can, for instance, be defined as a medium grain size of the material to be processed. However, it is also conceivable to define a grain size distribution or a maximum grain size as the feed size. The feed size is a suitable parameter for drawing conclusions about the load acting on the crushing and/or screening device as a result of processing the material. Therefore, it is a suitable parameter to be considered in the regulation and/or control of the supply. For instance, larger feed sizes, in particular larger lumps of rock, may be more difficult to crush, so it may be necessary to reduce the conveying speed, in particular despite a possibly low volume flow.

Likewise, the type of rock influences the crushing and/or screening processes. In particular, the type of rock can indicate a hardness of the material to be processed, which, for instance, can also have an influence on a suitable conveying speed.

Provision can be made for the characteristic and/or for the layer thickness to be determined by means of at least one sensor, and/or for the speed to be determined by means of a speed measuring device.

Provision can further be made for the at least one sensor to be an imaging sensor, in particular a camera, stereo camera, time-of-flight camera or a laser scanner. For instance, a camera may be able to produce two-dimensional color images or black-and-white images. Alternatively or additionally, stereo cameras, time-of-flight cameras or laser scanners can be used to capture three-dimensional images.

According to a preferred variant of the invention, provision can be made for at least one image recognition algorithm and/or object recognition algorithm to evaluate images captured by means of the at least one sensor, wherein the evaluation is directed towards the determination of at least one target variable, preferably a characteristic and/or layer thickness of the material to be processed.

In particular, provision can be made for the at least one target variable to be subdivided into classes, and that the evaluation of the images is used to assign an image to one of the classes of the target variable. For instance, the layer thickness can be divided into two to six classes. It is also conceivable that the feed size of the material to be processed is divided into two or more classes.

According to a preferred embodiment of the invention, provision can be made for the at least one image recognition algorithm and/or object recognition algorithm to be performed at least in part by at least one artificial neural network (ANN), in particular by at least one ANN having multiple layers, preferably by at least one convolutional ANN. In particular, it is conceivable that the at least one ANN performs at least parts of the image recognition algorithm and/or object recognition algorithm. ANNs are particularly suitable for determining the desired dimensions, such as the layer thickness and/or a characteristic, such as the type of rock and/or a feed size, based on the images captured by the at least one sensor. In particular, ANNs are particularly suitable for assigning images to classes of a target variable.

The complexity of the ANN can be reduced if provision is made for several ANNs to be used to evaluate the captured images, in particular for one ANN to be used to evaluate the layer thickness, for a further ANN to be used to evaluate the type of material to be processed, and/or for a further ANN to be used to evaluate the feed size. Thus, a specialized ANN can be used for each task, wherein several ANNs can of course be used for one task. Likewise, a modular structure of the algorithms results, because due to the specialization the ANN modules can be extended at will without the need to retrain existing modules. It is conceivable, for instance, that initially only one ANN is used to determine the layer thickness. In this case, another module can simply be added later, for instance to determine the type of rock, without having to modify and/or re-train any existing ANNs for layer thickness determination.

The processing time for evaluating the captured images can be reduced if provision is made for the multiple ANNs to be operated in parallel in one operating mode, in particular for the ANNs to be distributed across multiple computing units and/or CPUs, particularly preferably for every ANN to be assigned its own computing unit and/or CPU. The computing units and/or CPUs may be part of the data processing equipment of the material processing device.

However, a serial evaluation of several target variables in one ANN is also conceivable. In this case, greater processing power of the computing unit may be required. However, if only one ANN is used to evaluate multiple target variables, the effort required to maintain the training data can be reduced because, for instance, only one training database needs to be maintained.

According to the invention, provision can be made for the speed measuring device to be a mechanical speed measuring device. In that case, for instance, measuring wheels having incremental transducers can be considered. Preferably, however, provision can be made for the speed measuring device to be a non-contact speed measuring device, in particular a radar-, ultrasound- or laser-based speed measuring device.

According to an advantageous further development of the invention, it is proposed to predict a dwell time of the material to be processed on the basis of the characteristic and of the volume flow of the material to be processed, and to use the predicted dwell time of the material to be processed to control and/or regulate the conveying speed of the conveyor device.

The dwell time can be the time required to process a volume element or a mass element of a material to be processed in the crushing and/or screening plant or in an area of the crushing and/or screening plant. For instance, the dwell time can be the length of time a volume or mass element of material to be processed dwells in a crusher unit effecting the crushing.

To this effect, an inverse throughput rate of the crushing and/or screening plant can also relate or be equal to a dwell time. If the dwell time is now predicted and taken into account in the regulation and/or control of the conveying speed, the conveying speed can be regulated and/or controlled such that the time available according to the dwell time suffices for the material to be processed to be properly processed in the crushing and/or screening plant. In other words, a material feed can be achieved in terms of volume flow and/or conveying speed that does not result in underfilling or overfilling and/or underloading or overloading the crushing and/or screening plant when the dwell time of the material to be processed is equal to the predicted dwell time.

An improved prediction of the dwell time can be achieved if a plant type and/or a plant configuration, in particular a tooling, and/or a drive speed of the material processing device and/or the crushing and/or screening plant are taken into account.

According to a variant of the invention, provision can be made that by monitoring a filling level of the crushing plant, and/or a capacity utilization of the crushing plant and/or the capacity utilization of a drive motor of the crushing plant and/or the screening plant, the control and/or regulation of the conveying speed of the conveyor device is continuously adapted. These parameters can be used to draw conclusions as to whether the control and/or regulation of the conveying speed is suitable for avoiding overload and/or underload situations. In particular, it is conceivable that sensors perform the monitoring of one or more of the aforementioned parameters, for instance. The sensors can then transmit the parameters to the data processing equipment of the material processing device, for instance. Based on the results, the stored tables and/or maps and/or functional relationships can be adjusted automatically and/or manually, if necessary. For instance, if an overload has been detected, a target conveying speed can be lowered for the determined current volume flow and/or for the determined characteristic of the material to be processed for future operation.

In particular, it is also conceivable that one or more ANNs are used to control the conveying speed of the conveyor device. These may be implemented on the data processing equipment, for instance. Based on the parameters described above, such as the filling level of the crushing plant, and/or the capacity utilization of the crushing plant, and/or the capacity utilization of a drive motor of the crushing plant and/or the screening plant, the ANN(s) can be continuously supplied with training data. In this way, a continuous refinement of the control and/or regulation can be achieved.

According to a preferred variant of the invention, provision can be made for further characteristic variables to be used to control and/or regulate the conveying speed of the conveyor device, in particular a layer thickness on a pre-screen and/or on the screening plant and/or a filling level of the crushing plant and/or a mechanical stress of the crushing plant and/or of the prescreen, and/or a drive power of a drive motor of the crushing plant and/or of the screening plant and/or of a prescreen.

The problem relating to the material processing device is solved in that the material processing device is set up to enable the determination of a characteristic of the material to be processed, and/or in that the material processing device is set up to enable the determination of a volumetric flow rate of the material to be processed, and in that the material processing device is set up to enable the control and/or regulation of a conveying speed of the conveyor device, taking into account the characteristic and/or the volumetric flow rate of the material to be processed.

BRIEF DESCRIPTION OF THE DRAWINGS

The invention is explained in greater detail below based on an exemplary embodiment shown in the drawings. In the Figures.

DETAILED DESCRIPTION

Figure 1:
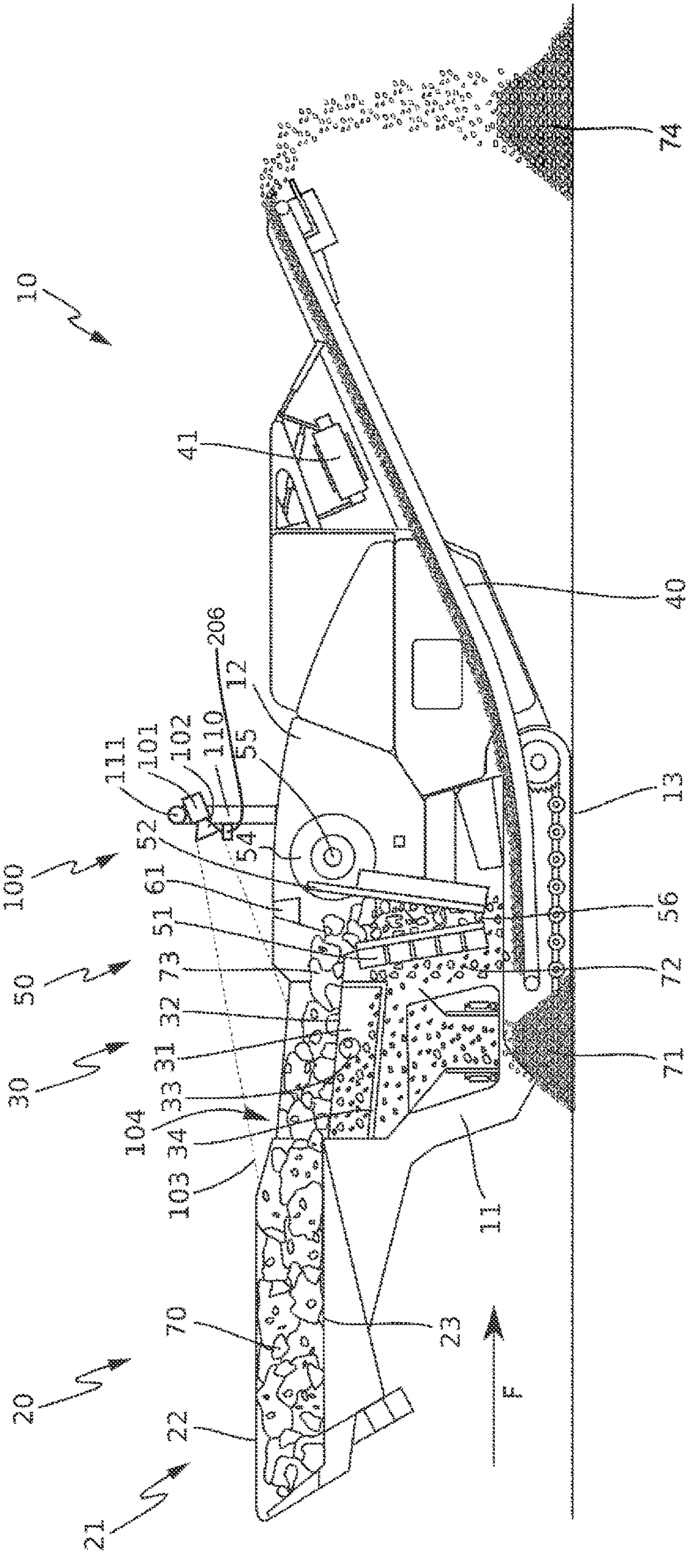
FIG. 1 shows a lateral, partially cut schematic representation of a material processing device

FIG. 1 shows a lateral, partially cut schematic representation of a material processing device 10. The material processing device 10 can be designed as a mobile unit having a chassis 11 and for instance a chain drive 13. The material processing device 10 may comprise a crushing plant 50 and/or a screening plant 30.

A hopper 21, which may have hopper walls 22, may further be provided at the material processing device 10, in particular at a feed unit 20. The hopper 21 may be used to receive feed material 70 from an upstream conveyor, such as an excavator, wheel loader, or belt conveyor, and direct it onto a conveyor device 23. Conveyor device 23 may also be referred to as conveyor 23. The crushing plant 10 or the screening plant 30, or both the crushing plant 10 and screening plant 30, may be referred to as a processing unit located downstream of the conveyor 23.

The crushing plant 50 and/or the screening plant 30 can be supplied with feed material 70 for processing in a conveying direction F by means of the conveyor device 23. In this case, the conveyor device 23 is designed as a vibratory feeder. However, other embodiments of a conveyor device 23, in particular as a conveyor belt, are also conceivable.

The screening plant 30 may, for instance, be connected upstream of the crushing plant 50 as a pre-screen unit. The pre-screen unit may comprise a heavy-duty double-deck screen 31, which may have an upper deck 32 designed as a coarser screen and a lower deck 34 designed as a finer screen. A drive 33 causes it to vibrate in a circular motion. The upper deck 32 can separate a fine fraction 71 and a medium fraction 72 from the material to be crushed 73. The lower deck 34 can separate the fine fraction 71 from the medium fraction 72. The fine fraction 71 can optionally be discharged from the material crusher plant 10 or be fed to the medium fraction 72 for instance by setting a bypass flap accordingly. The medium fraction 72 can be routed to a crusher discharge conveyor 40 past the crusher 50 via a bypass. The material to be crushed 73 is routed to the crusher 50 via a crusher inlet at the end of the pre-screen unit. The pre-screen unit may be part of the conveyor device 23.

The material processing device 10 may comprise a crushing plant 50 configured as a jaw crusher. However, it is also conceivable to provide other types of crushing plants 50, for instance impact crushers, gyratory crushers or cone crushers. The crushing plant 50 may comprise a stationary crushing jaw 51 and a moving crushing jaw 52, which may be oriented to converge at an angle such that a tapered shaft is formed therebetween. The shaft may open out into a crushing gap 56. For instance, the crushing plant 50 may be driven by a drive unit 12 via a drive shaft 55 connected to an eccentric 54.

The eccentric 54 moves the moving crushing jaw 52 towards and away from the stationary crushing jaw 51 in an elliptical motion. In the course of such a stroke, the distance between the crushing jaws 51, 52 in the area of the crushing gap 56 also changes. The motion of the moving crushing jaw 52 causes the material 73 to be crushed to be crushed further and further along the shaft until it reaches a grain size that allows it to exit the shaft through the crushing gap 56. The crushed material 74 falls onto the crusher discharge belt 40, which is used to convey it along. Provision can also be made, for instance, for it to pass a magnetic separator 41, which separates ferromagnetic components from the shredded material 74 and ejects them laterally.

As FIG. 1 further shows, the material processing device 10 may comprise a sensor 101. It is also conceivable that multiple sensors 101 are provided. As shown in the exemplary embodiment, the sensor 101 may be a camera. The camera may comprise a lens 102. A sensor holding device 110 may be used to hold the sensor 101 or sensors 101 to the material processing device 10. The sensor holding device 110 may be a pole, to which the sensor 101 or sensors 101 are attached.

The sensor 101 may be indirectly or directly attached to the material processing device 10 by a sensor adjustment device 111. Presently, the sensor 101 is indirectly attached to the material processing device 10 by a sensor adjustment device 111 via the sensor holding device 110. For instance, the sensor adjustment device 111 may enable an articulated connection to the sensor holding device 110 such that the sensor 101 or sensors 101 can be swiveled, for instance, to permit different orientations of the sensor 101 or sensors 101. It is also conceivable to attach the sensor 101 or sensors 101 to the material processing device 10 and/or the sensor holding device 110 in a height-adjustable manner.

The sensor 101 may have a detection volume 103. This can be provided, for instance, by an aperture angle of a lens 102 used. The sensor 101 may be configured to be standalone and/or to be used in combination with a lens 102 to sense a measurement range 104. The measurement range 104 of the sensor 101 may be in the area of the conveyor device 23.

In this case, the measurement range 104 is oriented such that the parts of the material to be processed that are located on the conveyor device 23 in the area of the prescreening area and in front thereof in the conveying direction lie in the detection area. The position of the measurement range 104 of the sensor 101 can also be chosen in a different manner, wherein preferably at least partially a range in the conveying direction upstream of the screening (30) and/or crushing (50) unit is chosen. It is also conceivable to provide multiple measurement ranges 104 with different positions, in particular when using multiple sensors 101.

As further shown in FIG. 1, a level sensor 61 may be assigned to the crushing plant 50. The latter can be designed as an ultra-sound sensor. However, it is also conceivable to use other types of sensors, such as optical sensors (for instance, a camera system), radar sensors, or mechanically acting sensors. The level sensor 61 may monitor the level of material 73 to be crushed in the crusher 50.

During operation of the material processing device 10, material to be processed is conveyed on the conveyor device 23 toward the crushing 50 and/or the screening plant 30. Here, the material being processed, which is within the measurement range 104 of one or more sensors 101, is monitored. For instance, a characteristic of the material to be processed is continuously determined.

The characteristic can be, for instance, the feed size and/or the type of material to be processed. The characteristic is determined, for instance, using a sensor 101 configured as a camera. However, it is also conceivable that the characteristic is also selected, for instance, by means of GPS data from values typical for the respective place of use of the material processing device.

Figure 2:
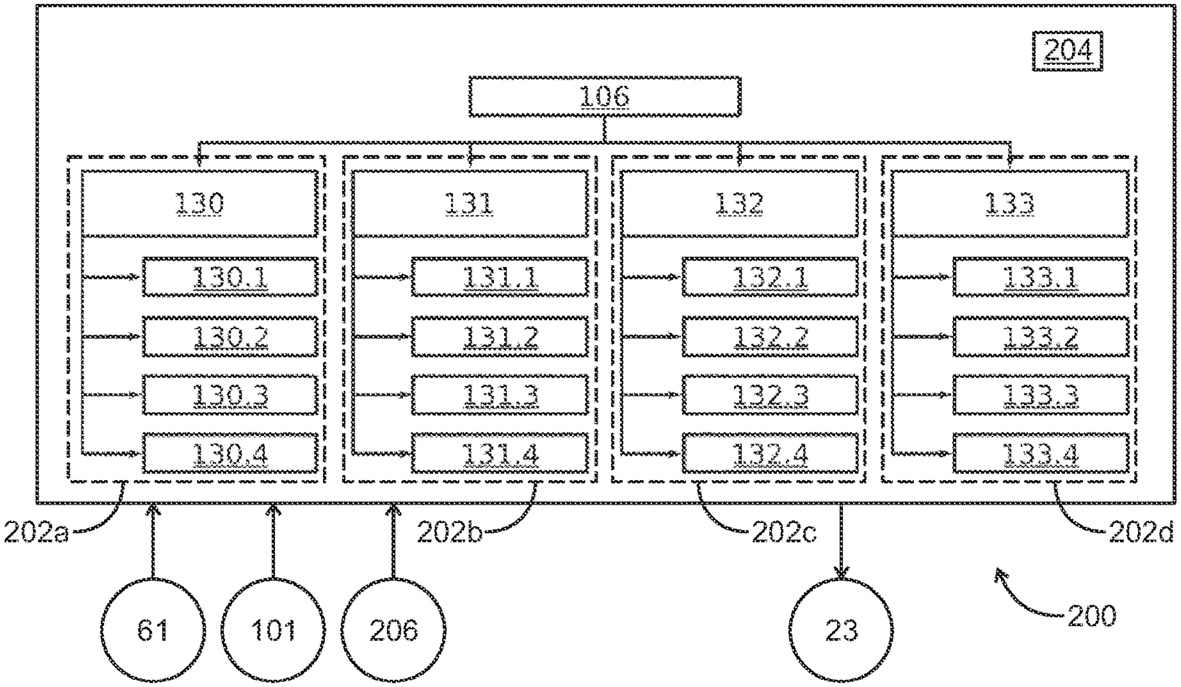
FIG. 2 shows a schematic drawing of the data processing equipment including an exemplary block diagram of a parallel evaluation of images by artificial neural networks.

Preferably, however, at least one sensor 101 captures images 106 that can be transmitted to data processing equipment 200 of the material processing device 10 schematically shown in FIG. 2. The data processing equipment 200 may be adapted to execute image recognition algorithms to determine the characteristic of the material from the images 106. The use of object recognition algorithms is conceivable here.

However, it is particularly preferred that ANNs 130, 131, 132, 133 are used for image recognition. ANNs 130, 131, 132, 133 may have been trained in advance using data sets of images 106 with known expression of a characteristic such as the feed size and/or the type of rock. For instance, ANN 132 may recognize different classes 132.1, 132.2, 132.3, 132.4 of feed sizes.

Thus, it is possible to determine the characteristic of the material that subsequently reaches the crushing 50 and/or the screening plant 30.

Furthermore, provision can be made for alternatively or additionally determining the volume flow of the material to be processed. Preferably, a speed measuring device 206, which may also be referred to as speed sensor 206 is provided for this purpose. This, for instance, can be used to determine a speed of the material to be processed located on the conveyor device 23. Speed sensor 206 may be mounted on the sensor holding device 110 adjacent the sensor 101.

To determine a volume flow, the layer thickness of the material to be processed on the conveyor device 23 can also be determined. The sensor 101 described above, which is used to determine the characteristic, for instance, or alternatively another sensor 101 may be used for this purpose. The layer thickness can also be divided into several classes 130.1, 130.2, 130.3, 130.4, etc., and evaluated by means of an ANN 130 as described above.

Preferably, the evaluation of the images 106 with respect to the various target variables is performed by means of separate ANNs 130, 131, 132, 133, wherein several ANNs 130, 131, 132, 133 preferably run in parallel each on a separate computing unit and/or CPU 202*a*, 202*b*, 202*c* and 202*d* as described below.

FIG. 2 shows an exemplary block diagram of a parallel evaluation of images 106 by ANN 130. As can be seen from the figure, the captured images 106 can be transferred to several ANNs 130, 131, 132, 133 wherein, for instance, ANN 130 can be provided for evaluating the layer thickness and/or ANN 131 can be provided for evaluating the type of rock and/or an ANN can be provided for evaluating the feed size 132 and/or a further ANN 133 can be provided for evaluating further target variables.

The target variables can be divided into classes 130.1, 130.2, 130.3, 130.4, 131.1, 131.2, 131.3, 132.4, etc., respectively, wherein the same or different numbers of classes 130.1, 130.2, etc. can be provided for the different target variables to be determined for the ANNs 130, 131, 132, 133.

The characteristic and/or volume flow of the material to be processed can now be transferred to the data processing equipment, for instance a computing and/or memory unit of the material processing device 10. Alternatively, the characteristic and/or the volumetric flow rate have been determined previously by means of the data processing equipment if, for instance, the image and/or object recognition algorithms and/or the ANNs 130, 131, 132, 133 are implemented thereon.

FIG. 2 schematically represents this alternative embodiment wherein the data processing equipment 200, which may also be referred to as a controller 200, has the ANNs implemented thereon. The data processing equipment 200 may include the separate parallel computing units and/or CPU's 202*a*, 202*b*, 202*c* and 202*d* on which the ANNs 130, 131, 132 and 133, respectively, are implemented. The data processing equipment 200 may include the memory unit 204 which may be any conventional means of data storage or computer memory. The data processing equipment 200 may receive input signals from the various sensors such as sensor 101, level sensor 61, and speed sensor 206, which input signals are indicated by arrows pointing toward the data processing equipment 200. The data processing equipment 200 may generate control signals, such as for example to control the conveying speed of conveyor 23, which control signals are indicated by arrows from the data processing equipment 200 to the controlled device.

The data processing equipment 200 can now be used to determine a target conveying speed, taking into account the transferred parameters. For instance, one or more tables, maps and/or functional relationships can be stored in computer memory 204 in the data processing equipment 200, which, taking into account the predictive parameters entered, enable a target conveying speed to be determined. The conveyor device 23 can be controlled or regulated to this target conveying speed.

Preferably, a dwell time of the material to be processed in the crushing 50 and/or screening plant 30 is predicted based on the determined characteristic and/or volume flow. In this regard, the dwell time may be a measure of how long it will take to process a volume or mass element of the material to be in the crushing 50 and/or screening plant 30 or in an area of the crushing 50 and/or screening plant 30, for instance, the dwell time in the crushing chamber in front of the crushing gap 56. Based on the predicted dwell time, the conveying speed can be predictively controlled and/or regulated accordingly preventing an overload or underload situation, such as in the case of the crushing chamber being overfilled or underfilled. In particular, a target conveying speed can be determined, which, in combination with the determined volume flow, allows sufficient processing time, in particular according to the predicted dwell time.

In other words, unlike the prior art, which reacts to underfilling or overfilling, according to the present invention, overfilling or underfilling of the crushing chamber is prevented or cannot even occur at all.

For instance, in one operating situation, it is determined that there is a hard material having a large feed size on the conveyor device 23. In particular, it is determined, for instance, that the material is to be assigned to a hardness class 131.4, which means a great hardness. Also, at the moment of detection, the material has, for instance, a high layer thickness and/or is assigned to a high layer thickness class 130.4. Based on these parameters, for instance, a comparatively long dwell time results. The dwell time can be determined from the parameters, for instance, by the data processing equipment 200. In particular, the data processing equipment 200 can determine a dwell time taking into account the parameters from one or more tables, maps and/or functional relationships stored in computer memory 204 of the data processing equipment 200, for instance. Preferably, provision can also be made for the dwell time to be determined from the determined parameters by means of an ANN.

The target conveying speed of the conveyor device 23 can be adjusted to properly process the fed material. Accordingly, then there is sufficient processing time for the material, which is equal, for instance, to the dwell time.

In this manner, the operation of the material processing device 10 can be ensured to allow an uninterrupted processing of material with optimum capacity utilization of the crushing 50 and/or screening plant 30.

For instance, to continuously improve the control and/or regulation of the conveying speed and/or the prediction of the dwell time, the fill level sensor 61 can be used to monitor the fill level of the crushing plant 50. The monitored level can be transferred to the data processing equipment 200. If then the level is detected to be too high or too low during operation despite the predictive control, the tables and/or maps and/or functional relationships can be adapted to better avoid such situations in the future.

For instance, in an operating situation where a dwell time was predicted, an excessively high crusher level is determined. In that case, for instance, the dwell time to be predicted for the parameters determined, such as the characteristic of the material to be processed, can be corrected. For instance, the recordings 106 used by the one or more ANNs 130, 131, 132, 133, 134 to determine a dwell time may be tagged (labeled) with the corrected dwell time and provided to the one or more ANNs 130, 131, 132, 133, 134 as training data.

In addition to the crusher filling level, other operating parameters such as the capacity utilization of the drive motor of the crushing 50 and/or screening plant 30 are of course also suitable for this purpose.

The invention claimed is:

1. A method for controlling and/or regulating a feed of material to be processed to a processing unit of a material processing apparatus, the material processing apparatus including a conveyor upstream of the processing unit and configured to guide the material to be processed to the processing unit, the method comprising:

determining a characteristic of the material to be processed and/or a volumetric flow rate on the conveyor of the material to be processed;

predicting a dwell time of the material to be processed in the processing unit or in a region of the processing unit downstream of the conveyor based at least in part on the characteristic of the material to be processed and the volumetric flow rate of the material to be processed; and controlling and/or regulating a conveying speed of the conveyor based at least in part on the characteristic of the material to be processed and/or the volumetric flow rate of the material to be processed, wherein the controlling and/or regulating the conveying speed of the conveyor is based at least in part on the predicted dwell time.

2. The method of claim 1, wherein:

the characteristic includes a feed size of the material to be processed and/or a type of the material to be processed.

3. The method of claim 1, further comprising:

determining a speed of the material to be processed;

determining a layer thickness on the conveyor of the material to be processed; and determining the volumetric flow rate of the material to be processed based at least in part on the determined layer thickness, the determined speed of the material to be processed and a geometry of the conveyor.

4. The method of claim 3, wherein:

the characteristic and/or the layer thickness is determined by at least one sensor.

5. The method of claim 4, wherein:

the at least one sensor is an imaging sensor selected from the group consisting of a camera, a stereo camera, a time-of-flight camera and a laser scanner.

6. The method of claim 4, wherein:

the determining of the characteristic and/or the determining of the layer thickness includes:

capturing images with the at least one sensor; and evaluating the images using at least one image recognition algorithm and/or at least one object recognition algorithm to determine at least one target variable, the at least one target variable including the characteristic and/or the layer thickness of the material to be processed.

7. The method of claim 6, wherein:

the at least one target variable is subdivided into classes and the evaluating of the images results in assignment of an image to one of the classes of the target variable.

8. The method of claim 6, wherein:

the at least one image recognition algorithm and/or at least one object recognition algorithm is performed at least in part by at least one artificial neural network.

9. The method of claim 8, wherein:

the at least one artificial neural network includes:

a first artificial neural network to evaluate the layer thickness;

a second artificial neural network to evaluate a type of material to be processed; and a third artificial neural network to evaluate a feed size of the material to be processed.

10. The method of claim 9, wherein:

the first, second and third artificial neural networks are operated in parallel.

11. The method of claim 10, wherein:

the first, second and third artificial neural networks are each operated on its own computing unit.

12. The method of claim 3, wherein:

the speed of the material to be processed is measured with a speed sensor selected from the group consisting of a radar-based speed sensor, an ultrasound-based speed sensor and a laser-based speed sensor.

13. The method of claim 1, wherein:

the predicting of the dwell time is based at least in part on a drive speed of the processing unit.

14. The method of claim 1, further comprising:

monitoring a capacity utilization of the processing unit; and wherein the controlling and/or regulating the conveying speed of the conveyor is based at least in part on the monitoring of the capacity utilization.

15. The method of claim 1, further comprising:

determining at least one further characteristic of the material to be processed selected from the group consisting of:

a layer thickness of the material to be processed on a pre-screen and/or on a screening plant;

a filling level of a crushing plant;

a mechanical stress of the crushing plant;

a mechanical stress of the pre-screen; and a drive power of a drive motor of the crushing plant and/or the screening plant and/or the pre-screen; and wherein the controlling and/or regulating the conveying speed of the conveyor is based at least in part on the at least one further characteristic.

16. The method of claim 1, wherein:

the processing unit includes a crushing plant and predicting the dwell time includes predicting how long it will take the crushing plant to crush a volume or mass element of the material to be processed.

* * * * *